US008803676B2

(12) United States Patent
Sitarski et al.

(10) Patent No.: US 8,803,676 B2
(45) Date of Patent: Aug. 12, 2014

(54) GRAPHIC DISPLAY APPARATUS

(75) Inventors: Nicholas Scott Sitarski, Ypsilanti, MI (US); Earnee Jones Gilling, Ypsilanti, MI (US); Erik Anthony Wippler, Canton, MI (US); Christopher Lee Rovik, Canton, MI (US); Michael Lambert, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 104 days.

(21) Appl. No.: 13/487,555

(22) Filed: Jun. 4, 2012

(65) Prior Publication Data
US 2013/0127876 A1 May 23, 2013

Related U.S. Application Data

(63) Continuation-in-part of application No. 13/302,441, filed on Nov. 22, 2011.

(51) Int. Cl.
*B60Q 1/00* (2006.01)
*G08B 7/00* (2006.01)
*G09G 5/00* (2006.01)
*G09G 3/00* (2006.01)
*G09G 1/00* (2006.01)

(52) U.S. Cl.
CPC ............... *G09G 3/004* (2013.01); *G09G 3/005* (2013.01); *G09G 1/007* (2013.01)
USPC ..................... 340/438; 340/691.1; 340/691.2; 340/691.4; 340/691.6; 345/473; 345/1.1

(58) Field of Classification Search
None
See application file for complete search history.

(56) References Cited

U.S. PATENT DOCUMENTS

| 7,642,901 | B2 * | 1/2010 | Kato et al. ..................... 340/438 |
| 7,890,088 | B2 | 2/2011 | de Leon et al. |
| 8,542,108 | B1 * | 9/2013 | Izdepski et al. ............... 340/461 |
| 2002/0065046 | A1 | 5/2002 | Mankins et al. |
| 2002/0095531 | A1 * | 7/2002 | Mori et al. ........................ 710/1 |
| 2005/0280521 | A1 * | 12/2005 | Mizumaki ..................... 340/438 |
| 2006/0109197 | A1 * | 5/2006 | Kuwabara et al. ............. 345/1.1 |
| 2006/0202979 | A1 * | 9/2006 | Manabe et al. ............... 345/204 |
| 2007/0030133 | A1 * | 2/2007 | Campbell ..................... 340/438 |
| 2007/0052703 | A1 * | 3/2007 | Seto ............................. 345/419 |
| 2008/0309762 | A1 * | 12/2008 | Howard et al. ............... 348/148 |
| 2010/0115683 | A1 * | 5/2010 | Krans et al. .................... 2/115 |
| 2013/0127609 | A1 * | 5/2013 | Sitarski et al. ............... 340/438 |
| 2013/0127876 | A1 * | 5/2013 | Sitarski et al. ............... 345/473 |

* cited by examiner

*Primary Examiner* — Julie Lieu
(74) *Attorney, Agent, or Firm* — Gifford, Krass, Sprinkle, Anderson & Citkowski, P.C.

(57) ABSTRACT

A graphic display apparatus within an automotive vehicle wherein the display apparatus includes at least two display units operable to display graphics and/or video, a wire connector connecting the at least two display units together, and a control system connected to the wire connector wherein the control system is operable to play video or graphics on the at least two display units. A method is provided to all the system to be universal for both audio and navigation systems wherein each system calls for a predetermined delay of the animation. The display units are in communication with one another providing for a coordinated or synchronized display of graphics. If, by way of example, a firework explodes on the main display screen, the remnants of that single firework will be exploded onto the secondary display screens.

7 Claims, 4 Drawing Sheets

GRAPHIC DISPLAY APPARATUS

CROSS-REFERENCE TO RELATED APPLICATIONS

This Application is a Continuation-in-part of application Ser. No. 13/302,441 filed on Nov. 22, 2011, entitled GRAPHIC DISPLAY APPARATUS.

FIELD OF THE INVENTION

The present invention relates generally to vehicle display apparatuses. More particularly, this invention relates to a vehicle display apparatus having a plurality of display screens wherein those display screens are synchronized.

BACKGROUND OF THE INVENTION

Vehicle display screens displaying information such as navigation systems, speedometer, vehicle information, fuel level, or other similar pieces of information are well known in the art. Similarly, vehicle display systems having a plurality of display screens within the vehicle are also well known in the art. Vehicle display systems typically include a main meter display located directly in front of the vehicle operator and behind or forward of the vehicle driver. A vehicle typically also includes a main navigation display screen located in the center console area of the vehicle. Vehicles also may include a display screen for the HVAC or heating and cooling systems on the center console of a vehicle. Further, it is well known in the art to provide welcome animation upon the opening of a door of a vehicle or upon ignition of the vehicle. The welcome screen is displayed on a single display screen and commonly includes a graphical display or a display of the company's logo. Previously known display screens only depict the welcome animation on one of the three or more display screens within a vehicle. Accordingly, it is advantageous to provide a vehicle display system having a plurality of display screens and allowing those display screens to interact or be synchronized.

SUMMARY OF THE INVENTION

The present invention provides for a graphic display apparatus within an automotive vehicle wherein the display apparatus includes at least two display units operable to display graphics and/or video, a wire connector connecting the at least two display units together, and a control system connected to the wire connector wherein the control system is operable to play video or graphics on the at least two display units. The display units are in communication with one another providing for a coordinated or synchronized display of graphics. If, by way of example, a firework explodes on the main display screen, the remnants of that single firework will be exploded onto the secondary display screens. Further, by way of example, scrolling text may scroll from one display screen to the other giving the synchronized impression to the user that the multiple display screens are similar to one large screen.

Further, the present embodiment provides for universal use of the system in vehicles with and without navigation systems. The system is provided as a universal system for ease of installation. Start time for the animation is adjusted for one or more of the displays of the multi-display animation based system in order to minimize the time until the Rear Vehicle Camera (RVC) is available.

DETAILED DESCRIPTION OF THE DRAWINGS

The present invention generally includes a plurality of display screens synchronized and in constant communication during the welcome screen animation of a vehicle. When the user either opens the vehicle door, starts the vehicle, or other trigger, a welcome screen animation sequence is displayed across three display screens. Three display screens including a main display screen wherein the navigation is ordinarily displayed, a secondary screen wherein the HVAC controls are normally displayed, and a third display screen on the meter are coordinated allowing for a synchronized welcome sequence. Animation from the main display screen may be exploded onto the secondary display screens. Alternatively, text or other graphics may scroll from each of the plurality of screens to display a unique appearance to the user.

Figure 1:
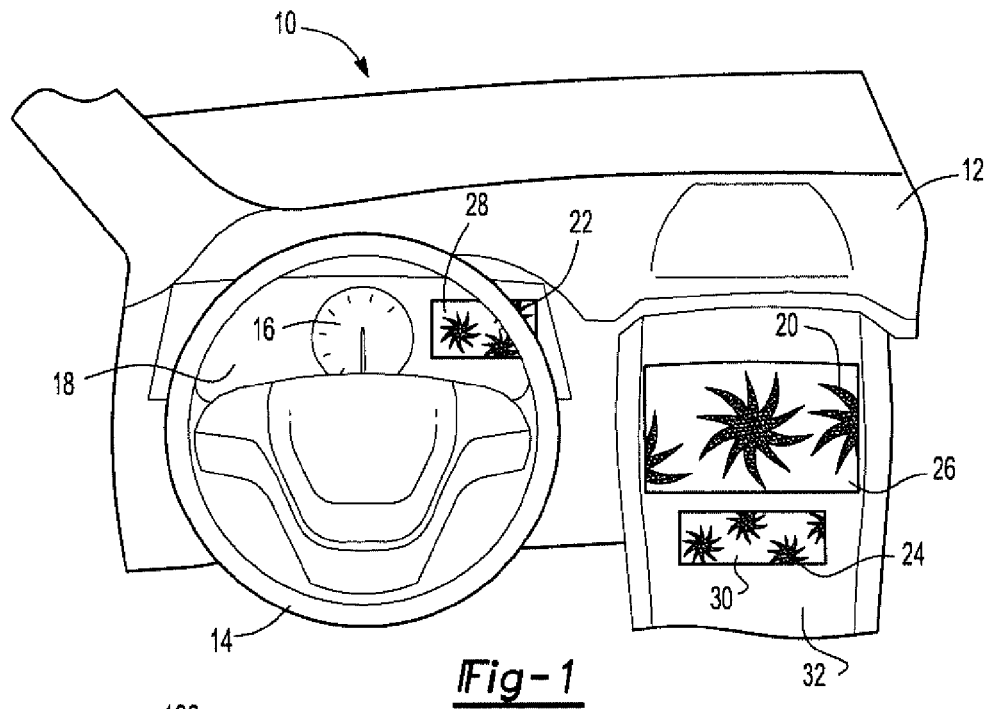
FIG. 1 is an environmental perspective view of a plurality of display screens located on the dashboard and center console of a vehicle.

FIG. 1 illustrates a perspective environmental view of the display apparatus 10 including the plurality of display screens 20, 22, 24. The main display screen 20 is normally used as the navigation and radio control screen. Secondary screen 22 is normally used to display a variety of items including speed, PRNDL, fuel level, etc. Tertiary display screen 24 is commonly used to display HVAC or heating and cooling status and further allows the user to adjust temperature or air flow. The main display screen 20 is located below the main dashboard 12 on the center console. The main display screen 20 includes an LCD display 26 supporting video and other graphics displays. The tertiary display screen 24 is located below the main display screen 20 on the center console 32. The tertiary display screen 24 includes an LCD display 30 supporting video and other graphics display.

The secondary display screen 22 is located forward of the steering wheel 14 on the meter display 18 having a plurality of meters 16. The secondary display 22 includes an LCD display 28 supporting video and other graphics display. The arrangement of the display screens 20, 22, 24 as shown in FIG. 1 is exemplary and not intended as limitations on the present invention. Various arrangements of the display screens 20, 22, 24 may also be provided.

Figure 2:
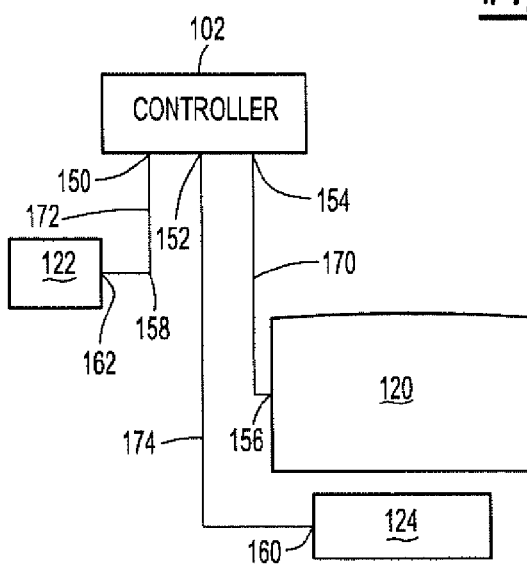
FIG. 2 illustrates a graphical representation of a display screen apparatus.
Figure 3:
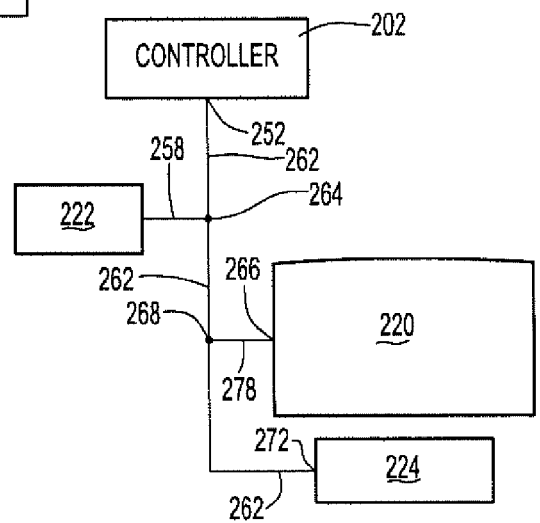
FIG. 3 illustrates an alternative arrangement for the display screen apparatus.

FIGS. 2 and 3 illustrate various configurations of controlling the display screens 20, 22, 24 together with the controller. FIG. 2 illustrates the first example of arranging the display screens in a connected or synchronized fashion. A controller 102 connects the plurality of display screens 120, 122, 124.

Separate hard wires 170, 172, 174 connect each of the display screens 120, 122, 124 to the controller 102. The display screen 120 is connected to the controller 102 by means of the hard wire 170. A connector 156 connects the hard wire 170 to the display 120. Further, a connector 154 connects the hard wire 170 to the controller 102.

Figure 4:
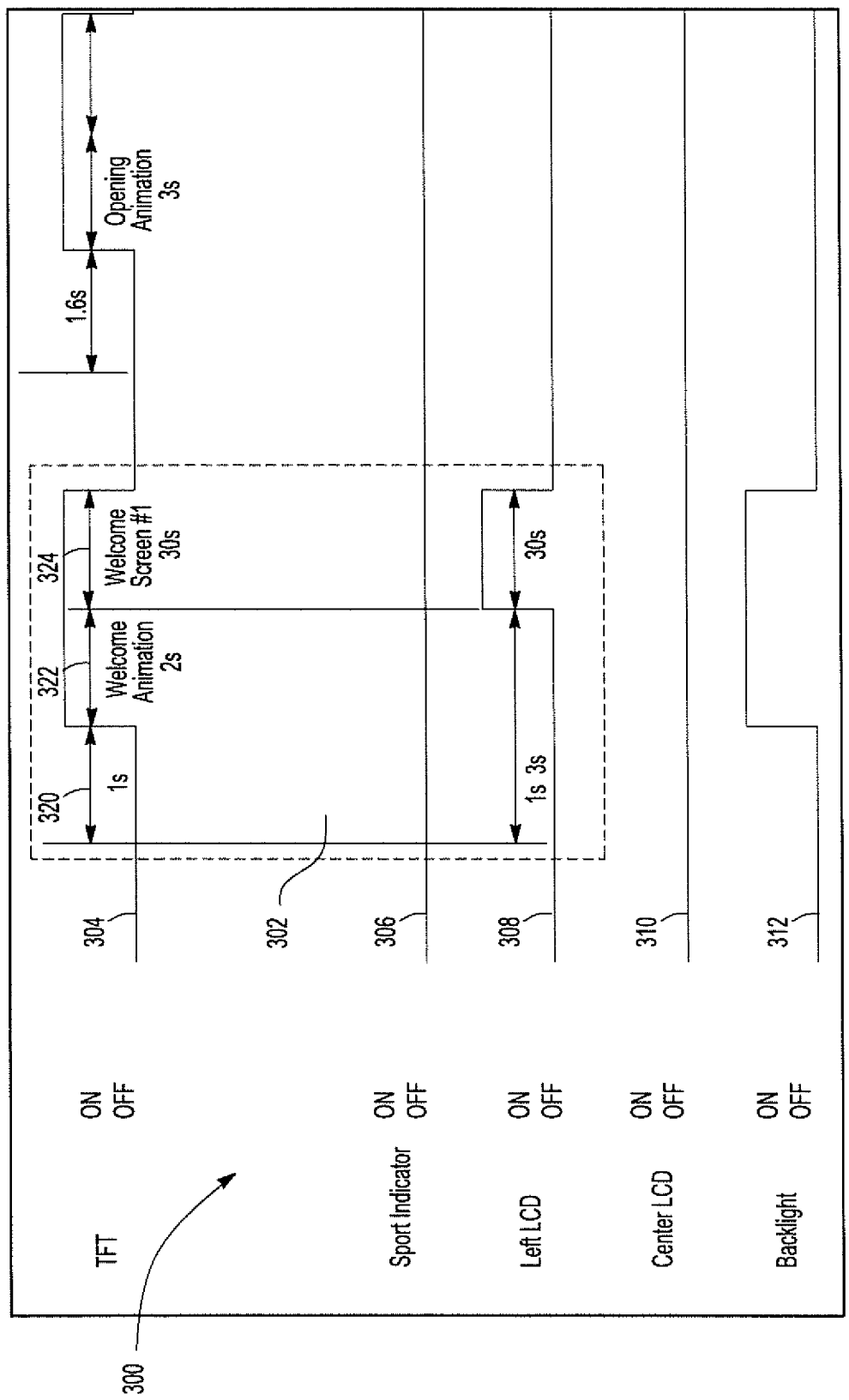
FIG. 4 illustrates the timing part depicting when the welcome animation will be displayed on the multiple screens.

The controller 102 is adapted to be the decision making center of the apparatus and system. The controller 102 provides timing of the display screens 120, 122, 124 according to the set standards. As shown in FIG. 4, an exemplary model of the timing is shown. The controller 102 dictates the sequence of the opening animation and other graphic displays 320, 322, 324, 302. The controller 102 causes the display screens 120, 122, 124 to display a predetermined image or video (or graphic) to be displayed on the plurality of screens 120, 122, 124 in a synchronized and coordinated fashion (as shown by the display screens 20, 22, 24 in FIG. 1). The controller 102 determines the length of time the graphics are displayed. The controller 102 is operable to control and display video, photo or other graphics. The controller 102 contains a graphics card to display said graphics on the display screens 120, 122, 124.

Further, the controller 102 is operable to control the backlighting of the display screens 120, 122, 124. The backlighting is controlled on the display screens 120, 122, 124 by timing means and level of intensity.

The controller 102 connects the plurality of display screens 120, 122, 124 so that a coordinated display is achieved. By way of example, not shown in the drawings, scrolling text may first be displayed on a screen farthest to the left hand side (122), continue to scroll to the middle screen (120) and then continue to scroll to the lowest (or farthest right) screen (124).

As clearly displayed in FIG. 1, the display screens 20, 22, 24, a fireworks display is shown. In FIG. 1, the graphics displayed on display screen 20 is a large firework display originating at solely display screen 20. The controller 102 dictates that the graphics on display screen 20 starts and remain on display screen 20 for a predetermined period of time. As a predetermined period of time progresses, the controller 102 permits the graphics on display screen 20 to continue motion (such as a firework bursting). The firework bursting, as show in FIG. 1, is permitted by the controller 102 to explode onto the secondary screens 22, 24. After a predetermined period of time, the controller 102 terminates the operation of the graphics display (as shown in FIG. 1, a fireworks display). The controller 102 allows for coordination between the display screens 20, 22, 24 to provide coordinated, synchronized and lifelike animation and graphics.

The display screen 122 connects to the controller 102 by means of the hard wire 172. The connector 162 connects the hard wire 172 to a display screen 122. The connector 150 connects the hard wire 172 to the controller 102.

The display screen 124 connects to the controller 102 by means of the hard wire 174. The hard wire 174 connects to the display screen 124 by means of the connector 160. The hard wire 174 connects to the controller 102 by means of the connector 152.

FIG. 3 illustrates an alternative configuration of the display screens in the controller. A controller 202 connects to the plurality of display screens 220, 222, 224 by a main hard wire 262. The main hard wire 262 connects to the controller 202 by means of the connector 252. The hard wire 258 connects to the display screen 222. The hard wire 258 breaks off from the main hard wire 262 at the connection point 264. Further, the main hard wire 262 connects to the hard wire 278 at the connector point 268. The hard wire 278 connects the main hard wire 262 to the main display screen 220. The hard wire 278 connects to the display screen 220 by means of the connector 266.

The hard wire 262 then extends to the display screen 224. The hard wire connects to the display screen 224 by means of the connector 272. As a result of these connections, the welcome screens displayed on the display screens 220, 222, 224 are synchronized and give the user the appearance that the display screens are one and the same. By way of example, if a firework exploded on the main screen 220, the remnants of that firework will also be exploded onto the secondary and tertiary display screens 222, 224. Further, by way of example, if text starts scrolling on the secondary display screen 222, the text will scroll onto the main display screen 220 and further onto the tertiary display screen 224. The plurality of hard wires and connectors allows the display screens 220, 222, 224 to produce synchronized animation on the welcome screen within a vehicle.

FIG. 4 illustrates the timing sequence of the welcome screens and other backlighting as displayed on the screens 20, 22, 24 (or the display screens 120, 122, 124 or the display screens 220, 222, 224 as displayed in FIGS. 2 and 3, respectively). As shown by the time line 304, the thin film transistor display screen displays a variety of welcome animation in varying time periods. The indicator box at 302 illustrates the welcome sequence of the plurality of display screens as shown in FIGS. 1-3. Further, the time line sequence 306 of the support indicator is also displayed.

The welcome sequence further includes the left LCD display screen time sequencing 308 within the welcome sequence 302. Further, the center LCD sequence timing 310 and the backlight timing 312 are also displayed in the timing chart 300. Upon activation of a certain condition, such as opening a door or vehicle ignition, a welcome sequence is displayed after the one second start 320. The welcome animation 322 and welcome screen 324 on the thin film transistor sequencing time line 304 illustrates the timing of the welcome screens on the various displays 20, 22, 24. In the present example, the welcome animation 322 is shown for a period of two seconds followed by a secondary welcome screen 324 which is shown for a total of 30 seconds. Of course, these times may vary according to vehicle demands and user requirements.

This welcome animation 322 and welcome screens 324 are displayed on all three display screens including the main display screen 20, the secondary display screen 22, and the tertiary display screen 24. During the welcome animation 322, all three display screens 20, 22, 24 are synchronized to display the coordinated graphics, such as a firework or scrolling text.

Figure 5:
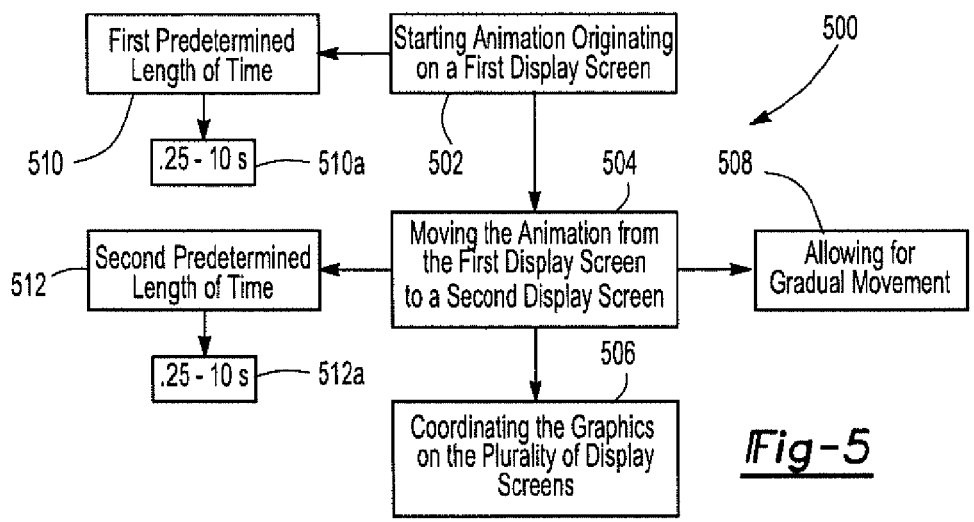
FIG. 5 illustrates the method in accordance with the present invention.

FIG. 5 illustrates the method 500 in accordance with the present invention. The method includes the steps of starting 502 animation originating on a first display screen for a first predetermined length of time, moving 504 the animation from the first display screen to a second display screen after a second predetermined length of time and coordinating 506 the graphics on the plurality of display screens to generate an appearance of movement between a plurality of display screens of graphics displayed on the plurality of display screens.

The method further comprises the steps of allowing 508 movement from the first display screen to the second display screen of the graphics to be gradual. The first predetermined amount 510 of time ranging between 0.25 seconds and 10 seconds. The second predetermined amount 512 of time ranges between 0.25 seconds and 10 seconds.

Figure 6:
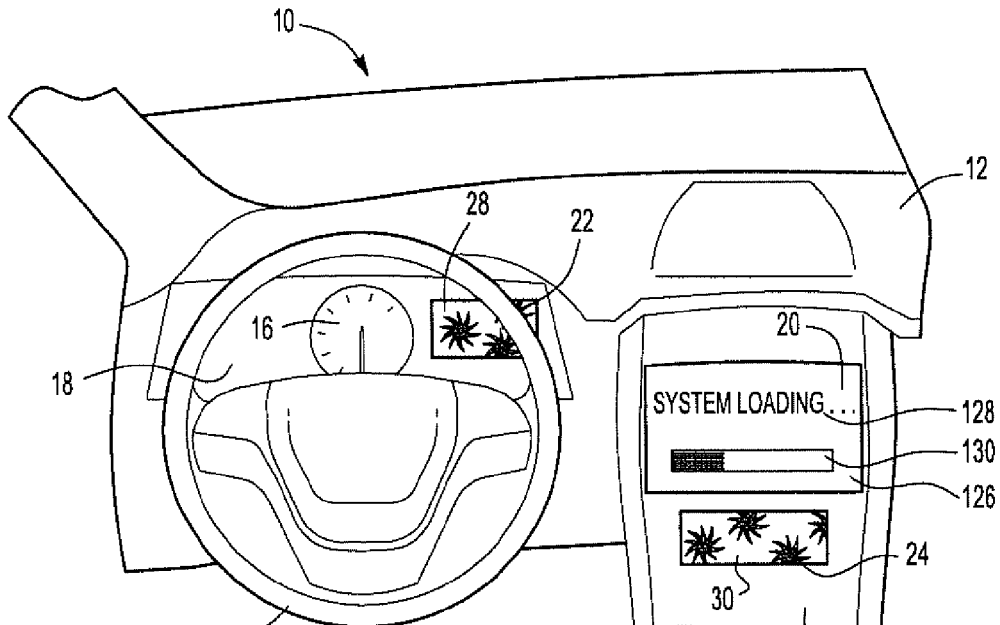
FIG. 6 is an environmental perspective view of a plurality of display screens located on the dashboard and center console of a vehicle wherein the center display screen is loading and calibrating.
Figure 7:
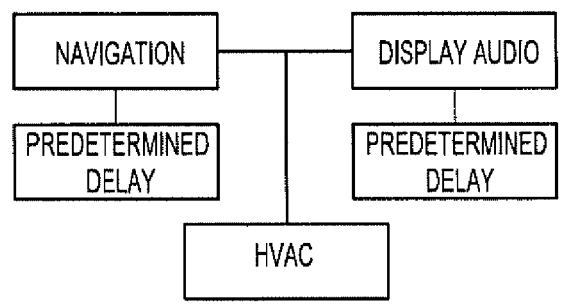
FIG. 7 is a flow chart of the operations of the current system.
Figure 8:
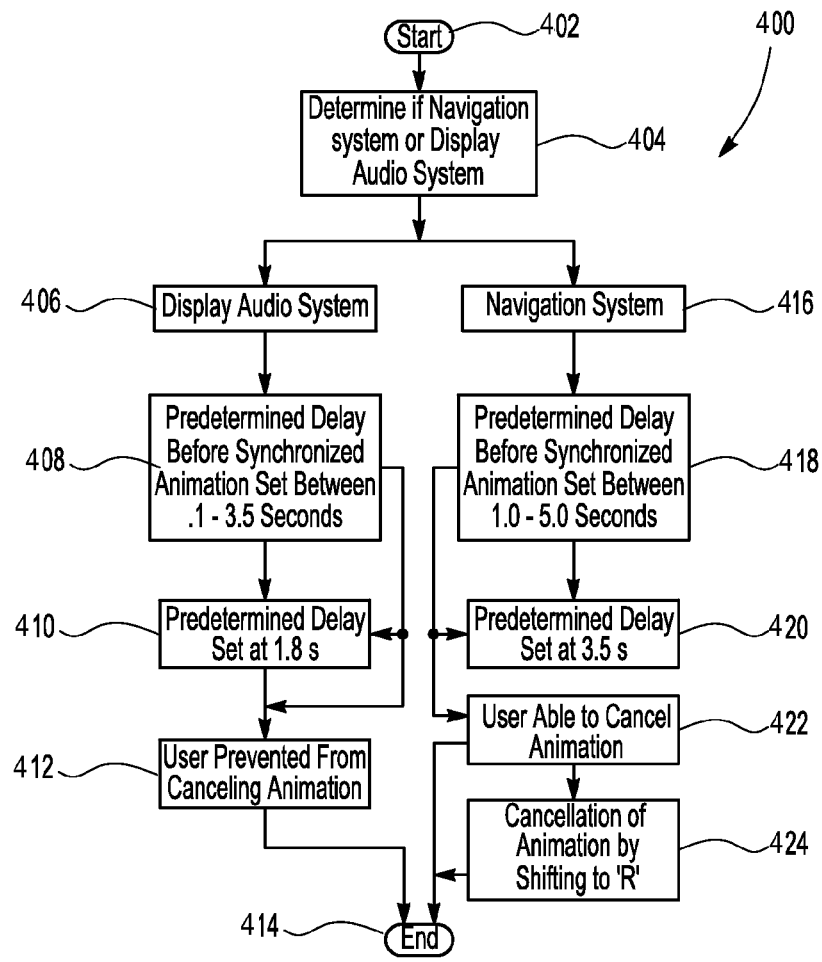
FIG. 8 is a flow chart illustrating the timing of the display screens of both a system having navigation or just display audio.

FIGS. 6-8 illustrate the timing and universal system of the present invention. It is well known in the art to have vehicles with audio display screens which may optionally be upgraded to navigation systems while using the same screen and hardware. However, the navigation systems often require different software. Furthermore, these display audio and navigation systems also frequently include a back up camera to allow the user to view the rear of the vehicle when the vehicle is placed in "Reverse."

The present system is operable to be used universally with both the Display Audio and Navigation. The system is designed to be easiest compatible with the Display Audio system and may be calibrated to the Navigation system upon an initial calibration.

FIG. 6 illustrates a perspective environmental view of the display screen including the plurality of display screens 20, 22, 24. The main display screen 20 is normally used as the navigation and radio control screen. Secondary screen 22 is normally used to display a variety of items including speed, PRNDL, fuel level, etc. Tertiary display screen 24 is commonly used to display HVAC or heating and cooling status and further allows the user to adjust temperature or air flow. The main display screen 20 is located below the main dashboard 12 on the center console. The main display screen 20 includes an LCD display 26 supporting video and other graphics displays. The tertiary display screen 24 is located below the main display screen 20 on the center console 32. The tertiary display screen 24 includes an LCD display 30 supporting video and other graphics display. In FIG. 6, the main display screen 20 includes the screen shown on startup within the Navigation system package. The Display Audio package shows the animation as shown in FIG. 1 upon startup. The graphic 126/130 as shown in FIG. 6 is also shown if the battery in the vehicle is at any time disconnected and the Navigation system is required to reboot.

FIG. 8 illustrates the method 400 of the present invention. The process starts 402 by determining if the vehicle is equipped with a navigation or display audio system 404. If the software is determined to be for the Display Audio System 406, a predetermined delay 408 before the exploding animation (discussed above) is set between 0.1 and 3.5 seconds. In the present embodiment, the predetermined delay is set at 1.8 seconds before the animation begins after start. The user is unable to cancel the animation 412 to view the backup camera, but since the animation is displayed sooner, the rear vehicle camera may also be used sooner. The process then ends 414.

If upon initial start of the vehicle the software is determined to be a Navigation System 416, then the predetermined delay before synchronized animation is set to between 1.0 and 5.0 seconds 418. In the present embodiment, the predetermined delay before animation is set to 3.5 seconds 420. In the Navigation software, the user is able to cancel 422 the animation by putting the vehicle into Reverse ('R') 424. The process then ends 414. The 3.5 second delay in animation allows the system to initialize and load prior to the display animation. The user may cancel the animation at any time during the animation to view the rear vehicle camera.

The step of determining if a Navigation System or Display Audio System 404 allows the system and software and process for the scrolling animation discussed above to be used universally for both Navigation and Display Audio Systems. Specifically, the HVAC display detects which audio system (display audio or navigation) is being used and adjust the start time in accordance with FIG. 8.

The invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

We claim:

1. A method for controlling a plurality of display screens within an automotive vehicle, a controller controlling a series of steps to generate a synchronized display on a plurality of display screens, the method of the controller comprising the steps of:
    determining whether a display screen to be used for originating an animation is a navigation system or an audio system;
    assigning a predetermined delay time before starting animation, the predetermined delay dependent upon whether system is the navigation system or the audio system;
    starting animation originating on a first display screen for a first predetermined length of time;
    moving the animation from the first display screen to a second display screen after a second predetermined length of time; and
    coordinating the graphics on the plurality of display screens to generate an appearance of movement between a plurality of display screens of graphics displayed on the plurality of display screens.

2. The method according to claim 1 wherein the movement from the first display screen to the second display screen of the graphics is gradual.

3. The method according to claim 1 wherein the first predetermined amount of time ranging between 0.25 seconds and 10 seconds.

4. The method according to claim 1 wherein the second predetermined amount of time ranges between 0.25 seconds and 10 seconds.

5. The method according to claim 1 wherein the predetermined delay for the navigation system ranges between 1.0 and 3.5 seconds.

6. The method according to claim 1 wherein the predetermined delay for the audio system ranges between 0.1 and 3.5 seconds.

7. The method according to claim 1 wherein the animation is cancelled when a user puts the vehicle into Reverse.

* * * * *